United States Patent [19]

Egosi

[11] Patent Number: 4,843,958
[45] Date of Patent: Jul. 4, 1989

[54] METHOD AND APPARATUS FOR APPLYING ADVERTISEMENTS TO EGGS

[75] Inventor: Isaac Egosi, Phenix City, Ala.

[73] Assignee: AMI International, Phenix City, Ala.

[21] Appl. No.: 121,360

[22] Filed: Nov. 16, 1987

[51] Int. Cl.⁴ .............................................. B41F 17/00
[52] U.S. Cl. ........................................... 101/2; 101/35; 101/407.1; 101/483; 209/514; 426/383
[58] Field of Search ................. 426/383; 209/514, 515, 209/512, 510; 101/35, 2, 426, 407.1, 483; 400/118

[56] References Cited

U.S. PATENT DOCUMENTS

| | | | |
|---|---|---|---|
| 4,168,662 | 9/1979 | Fell | 426/383 X |
| 4,323,317 | 4/1982 | Hasegawa | 400/118 |
| 4,383,613 | 5/1983 | Van Kettenbroek | 209/514 |
| 4,557,191 | 12/1985 | Speicher | 101/35 X |
| 4,609,059 | 9/1986 | Pasterkamp | 209/514 X |
| 4,682,182 | 7/1987 | Oyama et al. | 101/35 |

FOREIGN PATENT DOCUMENTS

| | | | |
|---|---|---|---|
| 1292 | 9/1931 | Australia | 101/35 |
| 0069038 | 1/1983 | European Pat. Off. | 101/35 |

Primary Examiner—Clifford D. Crowder
Attorney, Agent, or Firm—Watson, Cole, Grindle & Watson

[57] ABSTRACT

Advertisements are provided on precise areas of the outer surfaces of eggs. Dispensing apparatus such as an ink jet is spaced from the eggs and transfers advertisement material to the eggs. Egg handling structure is adapted to lift eggs and move them generally parallel with the long axes thereof and rotate the eggs about said axes to accurately position the eggs relative to the dispensing apparatus. The dispensing apparatus may be used at various locations on a conventional egg grading machine and structure is provided to support the eggs in uniform position relative to dispensing apparatus to precisely apply advertisements. Sorting apparatus sorts the eggs according to their vertical position on such a machine and employs adjustable guide structure having tiltable tips to prevent damage.

33 Claims, 9 Drawing Sheets

METHOD AND APPARATUS FOR APPLYING ADVERTISEMENTS TO EGGS

BACKGROUND OF THE INVENTION

The present invention relates to the application of advertisements to the outer surfaces of eggs. The invention relates to a completely new concept in the field of advertising. There are at present many mediums of advertising such as ads in newspapers, on television and radio, as well as billboards and the like, but the invention contemplates the utilization of a new medium, namely eggs which are sold at the retail level in grocery stores and supermarkets to the public at large.

Advertisements may be applied to the outer surfaces of eggs in such a manner as to be readily visible to persons buying the eggs. The advertisements are applied to precise areas of the egg so as to provide maximum exposure and to afford the most beneficial viewing angle. Eggs are usually sold in paperboard cartons and are supported therein so that the long axis of each of the eggs is disposed substantially vertically. Accordingly, by properly locating the advertisement on the egg, each time a person opens the carton, the advertisement will immediately catch the person's eye. Obviously, each time a person picks up an egg from the carton, the advertisement will be seen. Therefore, the advertisement is carried into the homes of customers and each egg serves as an advertising medium. Eggs are consumed by large numbers of people, and many consume eggs on a daily basis. Accordingly, the advertisements on the eggs will reach a large public with great frequency.

Advertisements applied to eggs may be in colors and otherwise made to be as artistically attractive as possible. Different advertisements may be applied to different eggs in the same carton, if desired. The advertisement may also extend around the egg if so desired and may consist of multiple lines of print or the like. Furthermore, any desired spacing may be provided between various portions of the advertisement.

It should be understood that whereas the invention is directed to the application of advertisements to the outer surfaces of eggs, it may also be utilized for applying any suitable message or information on eggs.

Prior art arrangements have been provided for applying information to the outer surfaces of eggs, such as the grade of the egg or dating information. This information has been applied using a stamping process or a non-impact process such as an ink jet set to apply information to eggs moving on the conveyor of a grading machine. However, the manner in which such processes are utilized in the prior art are not suitable for applying advertisements to an egg.

When placing information such as grade or dating information on eggs, this function is carried out because of governmental regulations, and it is not important to accurately locate the information on the outer surface of the egg. Accordingly, prior art methods do not ensure that the information is provided on a precise area of each of the eggs. On the other hand, as discussed above, it is important that advertisements be applied to precise areas of the eggs.

Additionally, when grade or dating information is applied to eggs, quality is not important, and relatively poorly displayed information is acceptable. However, when advertisements are applied to eggs, it is essential that the quality be as high as possible.

Prior art arrangements for applying information to eggs apply the information to all eggs passing through an egg handling machine, whereas when applying advertisements, it is desirable to sort the eggs so as to apply the advertisements only to certain eggs, while the remaining eggs are utilized for other purposes.

SUMMARY OF THE INVENTION

The invention employs conveying means for conveying eggs along a path. Advertisement dispensing means is provided adjacent the conveying means for transferring advertisement material onto the outer surfaces of eggs. Means is also provided for ensuring that the position of the eggs and the dispensing means relative to one another is such that the advertisement is provided on a precise area of the eggs. This ensures that the advertisement will be uniformly applied to each egg at the proper location to provide maximum advertising impact.

The proper positioning of the eggs relative to the dispensing means is accomplished in a number of manners. The position of the dispensing means is adjustable so as to permit the proper orientation. Suitable guide means is also provided to ensure that the eggs are disposed in proper position when the advertisement material is applied thereto Centrifugal force is also employed to properly position the eggs. Egg handling means is also provided for moving the eggs from the conveying means to the proper position relative to the dispensing means to ensure that the advertisement is provided on a precise area of the eggs. Proper positioning can additionally be ensured by providing support means for supporting the eggs while the advertisement is being applied thereto.

By applying the advertisement to a precise area of the eggs, better quality is provided. Additionally, when applying advertisements around an egg, better quality is obtained by rotating the egg while the advertisement material is being applied thereto. The egg may be rotated in opposite directions if required, and multiple lines of advertisement may be provided by adjusting the position of the eggs in a direction generally parallel with the long axes of the eggs. Accordingly a better degree of quality may be obtained than is possible with the prior art.

In the present invention, means is also provided for sorting the eggs so that only certain ones of the eggs have advertisements applied thereto. This is accomplished in a most simple and effective manner by providing means which separates the desired eggs from the undesired eggs according to the vertical positions of the eggs in an egg grading machine and moves the desired eggs into a uniform position relative to the dispensing means for application of the advertisements thereto.

DESCRIPTION OF THE PREFERRED EMBODIMENTS

Figure 1:
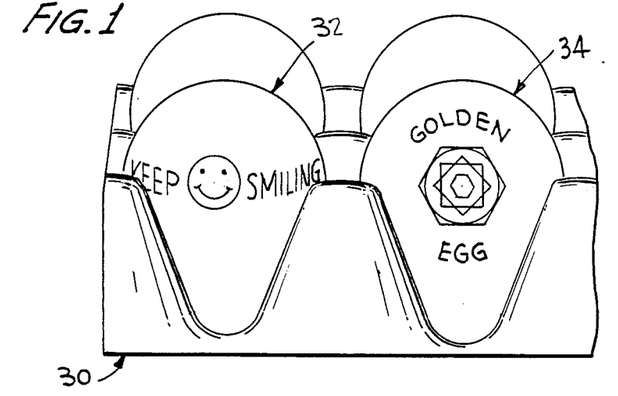
FIG. 1 is a top perspective view of a portion of an egg carton with eggs supported therein.

Referring now to the drawings wherein like reference characters designate corresponding parts throughout the several views, there is shown in FIG. 1 a portion of a conventional egg carton 30 having a plurality of eggs nested therein in the usual manner. One of said eggs 32 is provided with an advertisement on the outer surface thereof including a happy face logo and the words "KEEP SMILING". A second one of said eggs 34 is provided with a logo and the words "GOLDEN EGG". It will be noted that the advertisement on egg 32 is substantially along one horizontal line, while the advertisement on egg 34 is disposed along several vertically spaced lines. The advertisements are positioned on specific areas of the eggs so that the advertisements are properly displayed to an observer to provide optimum advertising value. When eggs are removed from their cartons, they are usually placed in trays built into refrigerator doors. When in such trays, the eggs will be positioned similar to the manner shown in FIG. 1 so that the advertising will likewise be presented to anyone who opens the refrigerator.

Figures 2, 3:
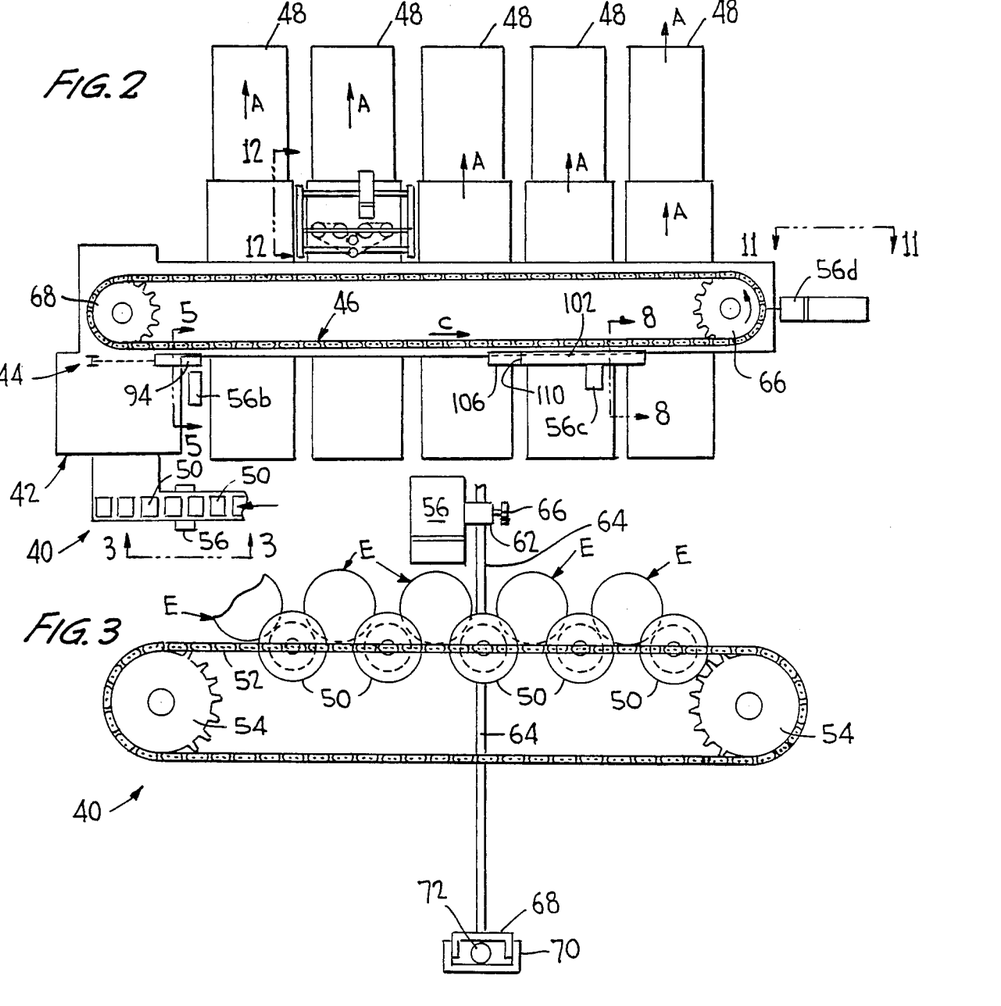
FIG. 2 is a top schematic view of an egg grading machine.
FIG. 3 is a view on an enlarged scale taken along line 3—3 of FIG. 2 looking in the direction of the arrows.

Referring now to FIG. 2, there is shown a conventional egg candling and grading machine such as the MOBA 4000, sold by MOBA U.S.A., Inc., 1647 Lloyd Street, Allentown, PA. This machine includes an infeed conveyor 40 which provides eggs to a candling area 42. A transfer conveyor transfers the eggs from the candling area to a grading conveyor 46. The grading conveyor moves in the direction of arrow C and deposits eggs according to grade into cartons carried along packing lanes 48. The cartons are carried laterally away from the machine in the direction of arrows A by suitable conveyors.

Figure 4:
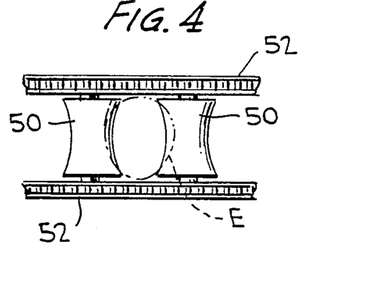
FIG. 4 is a top view of a pair of the conveyor rolls shown in FIG. 3.

Referring now to FIGS. 3 and 4, Advertisements are applied to eggs at a first location on the grading machine. The infeed conveyor 40 includes a plurality of substantially horizontally disposed rolls 50 which support eggs E thereon. The rolls are carried between a pair of endless chains 52 each of which travels over a pair of sprocket wheels 54 driven by suitable drive means. As seen in FIG. 4, the rolls are contoured so as to define surfaces having concave lines of contact with the supported eggs whereby the eggs will be uniformly located on the conveyor as indicated by egg E shown in phantom line.

Advertisement dispensing means 56 may comprise an ink jet type printer such as WILLETT PRINTOS 1600, sold by Willett International Limited, Dawson House, 24 Ladbrooke Road, Chalvey, Slough, England. This is a conventional ink jet printer as used in dot matrix printing systems. The dispensing means may also comprise a WILLETT LABELJET 2300, also sold by the last-mentioned company. In this system, a preprinted pressure sensitive label is applied by blowing air against the label to move into contact with an object. Each of these systems employs advertisement material. In the case of the ink jet, the ink is the advertisement material, and in the case of the LABELJET, the preprinted label is the advertisement material. In both cases, the advertisement material is transferred to an object and there is a minimal force of contact by the advertisement material so that fragile items such as eggs will not be damaged. There is a space between the dispensing means and the object on which the advertisement is applied at all times, thereby eliminating the possibility of the dispensing means interfering with the object in any way.

Figure 3A:
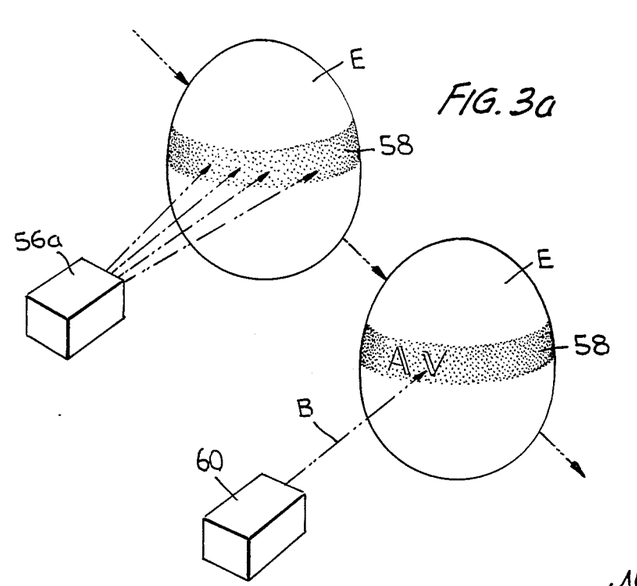
FIG. 3a is a somewhat schematic top perspective view showing a modification of the invention.

Referring now to FIG. 3a of the drawings, a modified dispensing means 56a is employed. In this case the dispensing means employs advertisement material in the form of a sensitive material that is sensitive to and will react to a conventional laser beam. The sensitive material is transferred to a precise area 58 of egg E. The egg is then conveyed downstream to a position adjacent to a laser 60 which projects a laser beam B onto the sensitive material on the egg to react therewith to produce the desired advertisement. Here again, there is a space between the dispensing means 56 and the object on which the advertisement is applied at all times.

As seen in FIG. 3, dispensing means 56 has an integral extension 62 having a bore formed therethrough through which a vertical rod 64 is slidable. A screw is threaded through a bore in extension 62 and engages rod 64 for adjusting the position of the dispensing means on the rod. The lower end of rod 64 includes a member 68 of generally U-shaped cross-section which is slidably supported within an elongated guide member 70 for guiding movement of member 68 relative thereto. A screw 72 or any other suitable means is provided for moving member 68 with respect to member 70. It is apparent that the dispensing means is adjustable in both vertical and horizontal directions. The dispensing means of 56a and laser 60 of FIG. 3a would each be adjustably mounted in a manner similar to dispensing means 56 of FIG. 3.

Figure 5:
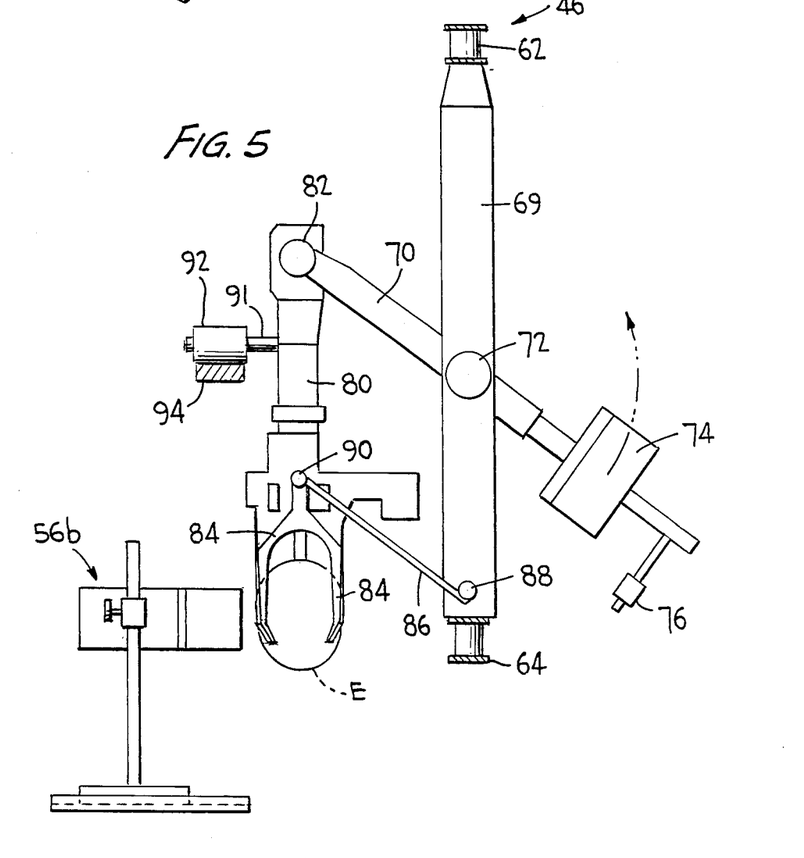
FIG. 5 is a sectional view taken through the grading conveying means of the machine taken along line 5—5 of FIG. 2 looking in the direction of the arrows.

Referring now to FIG. 5, a modification of the invention is shown wherein advertisements are applied to eggs at a different location on the grading machine. The grading conveying means 46 includes an upper chain 62 and a lower chain 64, each of which passes around sprocket wheels 66 and 68 shown in FIG. 2. A plurality of conventional balancing units are supported by the chains and are horizontally spaced from one another. Each of the balancing units includes a vertically disposed connecting member 69 extending between chains 62 and 64. A balancing arm 70 is pivotally connected at 72 to each connecting member. Adjustable weights 74 and 76 provide coarse and fine adjustments for the balancing arms. A depending carrier 80 is pivoted to the outer end of arm 70, and a plurality of fingers 84 are pivotally supported at the lower end thereof. These fingers are resiliently biased inwardly to grip an egg therebetween and support the egg at the lower end of the carrier. A link 86 is pivotally connected at one end thereof to the lower end of member 69, the opposite end being pivotally connected to a lower portion of carrier 80. Link 86 in conjunction with arm 70 forms a parallelogram arrangement.

In operation, the weight of the egg held by fingers 84 causes arm 70 to pivot about axis 72, and the carrier 80 moves downwardly a distance proportional to the weight of the egg. Thus, eggs of different weight will be supported at different vertical levels. This differential vertical positioning of the eggs is utilized to separate the eggs into different grades adjacent packing lanes 48.

A shaft 91 extends laterally from carrier 80, and a guide means in the form of a roller 92 is journaled on this shaft. A guide member 94 in the form of a substantially horizontal rigid bar 94 is supported by the machine in fixed relationship thereto. This guide member extends downstream from the point where the transfer conveying means transfers eggs to the grading conveying means. When the egg is initially transferred to the fingers, the carrier tends to move downwardly. Engagement of roller 92 with bar 94 prevents such downward movement.

A dispensing means 56b identical to 56 previously described is disposed adjacent to the conveying means as shown in FIGS. 2 and 5. Engagement of the roller with the bar ensures that the eggs are supported in uniform relation to the dispensing means to enable the advertisement to be provided on a precise area of the eggs. The bar terminates downstream beyond the point where the advertising material is applied to the eggs. When the rollers no longer engage the bar, the carriers move downwardly into positions as determined by the weight of the associated eggs.

Figures 6, 7, 9, 9A, 10:
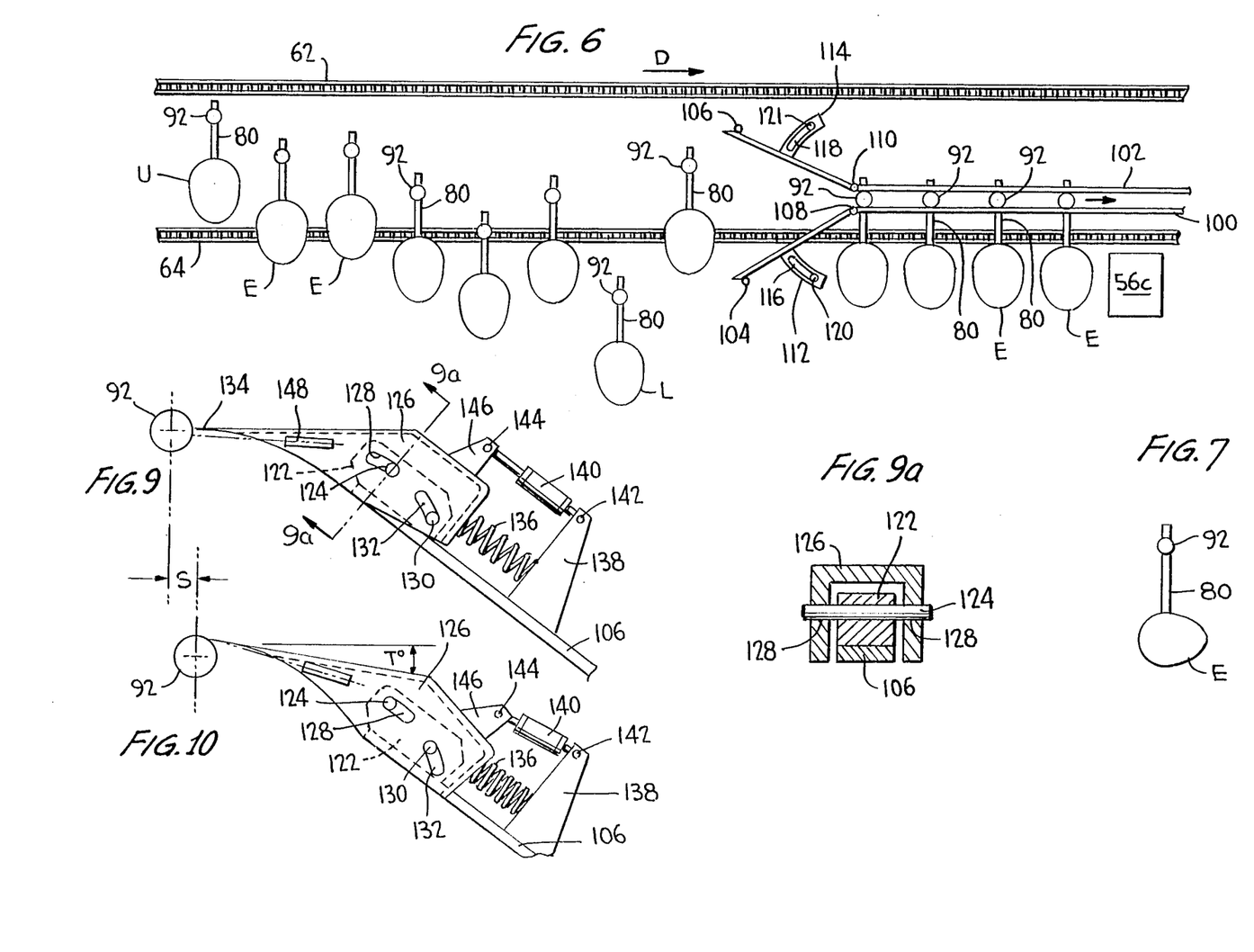
FIG. 6 is a somewhat schematic side view illustrating the sorting means of the invention as employed on the egg grading machine shown in FIG. 2.
FIG. 7 is a side view illustrating a different orientation of an egg carried by the grading conveying means of the machine.
FIG. 9 is an enlarged side view of a modified form of tip on the guide means shown in FIG. 6.
FIG. 9a is a sectional view along line 9a—9a of FIG. 9 looking in the direction of the arrows.
FIG. 10 is a view similar to FIG. 9 showing the parts in a different position.
Figures 8, 11:
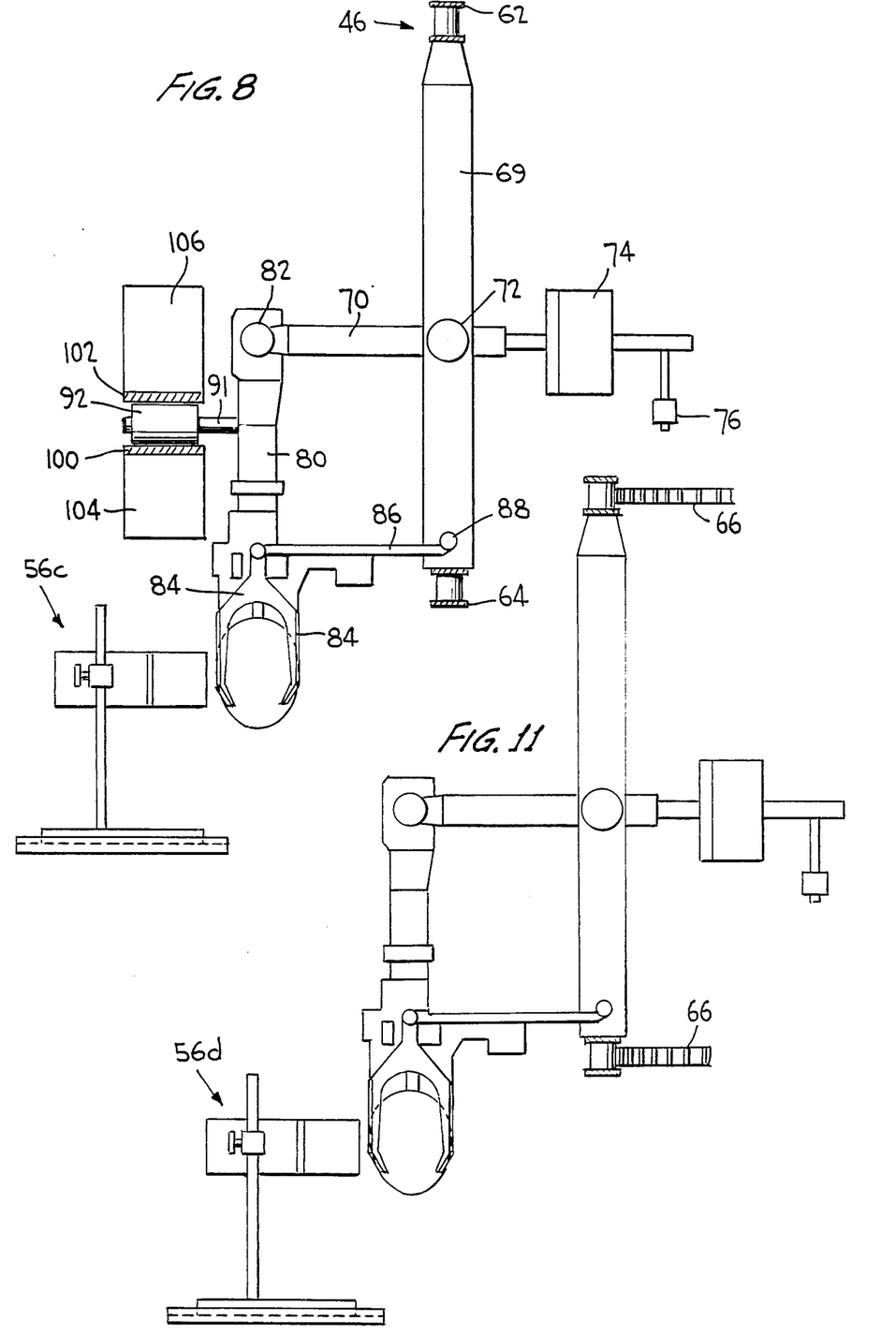
FIG. 8 is a sectional view taken along line 8—8 of FIG. 2 looking in the direction of the arrows.
FIG. 11 is a view taken along line 11—11 of FIG. 2 looking in the direction of the arrows.

Referring now to FIGS. 6 and 8, a further modification of the invention is illustrated wherein the advertisement is applied at still another position on the machine. As seen in FIG. 6, the eggs E at the left portion of this figure are shown as having moved to different vertical levels according to the weight thereof in the usual manner. The eggs E at the right portion of this figure are shown as disposed at the same vertical level as will be as explained hereinafter.

Guide means includes a pair of rigid tracks 100 and 102 supported in fixed relationship to the machine adjacent to the grading conveying means. The tracks are vertically spaced from one another and are disposed in such a position as to receive therebetween rollers 92 secured to each of the balancing units. Dispensing means 56c identical to dispensing means 56 previously described is supported such that. it is adapted to apply advertisements to the eggs while the balancing units are in the position shown in FIG. 8 wherein the eggs are in a uniform vertical position due to interengagement between tracks 100, 102 and rollers 92.

A movable guide portion 104 is pivotally mounted at 108 and forms an extension of track 100. A movable guide portion 106 is pivotally mounted at 110 and forms an extension of track 102. Members 112 and 114 extend away from members 104 and 106 respectively and have arcuate slots 116 and 118 formed therein. Screws 120 and 121 extend through slots 116 and 118 respectively and serves to hold members 104 and 106 in adjusted position. Adjustment of members 104 and 106 will serve to guide different ones of the eggs moving downstream of the device in the direction of arrow D into the space between tracks 100 and 102.

As shown in FIG. 6, the rollers connected to the carriers carrying the uppermost egg U and the lowermost egg L will pass by the outer ends of members 104 and 106 as the eggs move downstream, and accordingly eggs U and L will not be guided into the uniform position of the eggs shown at the right side of FIG. 6. Eggs U and L will therefore move downstream of the dispensing means without having an advertisement applied thereto. All of the remaining eggs at vertical levels lower than egg U and above egg L as shown in FIG. 6 will be guided into the uniform position since the rollers connected to the carriers carrying these remaining eggs will be engaged by members 104 and 106. Members 104 and 106 may be adjusted to various vertical levels so as to select the weight limits of the eggs to have advertisements applied thereto.

The adjustable guide portions 104 and 106 serve as a sorting means which is particularly useful since the lightest eggs and the heaviest eggs are generally used for industrial purposes, and are not sold at the retail level to the public. The invention arrangement may be adjusted such that the advertisements are applied only to those eggs which are to be sold at the retail level.

Referring now to FIG. 7, an egg E is shown as being supported by the balancing unit in such a position that the long axis of the egg is disposed substantially horizontally rather than vertically as shown in other figures of the drawings. The eggs may be supported in either of these orientations as desired.

Referring now to FIGS. 9 and 10, a further modified form of the invention is shown. The tips of each of guide members 104 and 106 may be provided with special constructions to prevent damage to the apparatus. The tips of the guide members are preferably rather sharp so that if a roller should contact the tip of the guide member, it will tend to move vertically and thereby not apply any substantial force to the tip in a downstream direction. The balancing units will be very sensitive to any impact and will move quite easily. However, in the event that a roller should contact a tip with the axis of the roller on the same vertical level as the tip, some damage could occur if the tip is not movable.

Referring now to FIGS. 9 and 9a, the construction of the tip associated with guide member 106 is illustrated, it being understood that the construction of the tip on guide member 104 may be identical. A member 122 is fixed to the upper surface of member 106 and has pins 124 extending from opposite sides thereof. A member 126 of generally inverted U-shaped configuration has a pair of slots 128 formed in the opposite legs thereof which receive pins 124. A further pair of pins 30 extend from opposite sides of member 122 and are received in slots 132. It is noted that slots 128 extend generally parallel with member 106, while slots 132 are disposed at an angle to slots 128.

The outer end 134 of member 126 is quite sharp to offer a very small area which can be contacted by a roller. Member 126 is biased into the position shown in FIG. 9 by a compression spring 136 disposed between member 126 and a member 138 fixed to guide member 106. A power operated device 140 has one operative end thereof pivotally connected to member 138 at 142, the opposite operative end of the device being pivotally connected at 144 to a member 146 connected to the upper surface of member 126. A sensor 148 is mounted on member 126 adjacent the sharp tip thereof, sensor 148 being of conventional construction so as to sense the presence of a roller in the position shown in FIG. 9. The sensor is suitably connected to power operated device 140 to energize and operate the device when a roller is sensed and move the mechanism into the position shown in FIG. 10.

As seen in FIG. 10, member 126 has been moved from its outermost position shown in FIG. 9 to its innermost position wherein member 126 has been moved into a tilted position such that the tip 134 is no longer aligned with the axis of rotation of the roller, and the roller will move onto the undersurface of member 126 and thence onto the surface of member 106 in a smooth manner without damaging the apparatus. It is evident that the pin and slot arrangement will cause member 126 to be moved into such a position. When the power operated device is deenergized, spring 136 will move member 126 back into the position shown in FIG. 9. The device will be operated to tilt member 126 even if the power operated device should be inoperative, since the force of roller 92 against the tip of member 126 will cause member 126 to tilt into the position shown in FIG. 10. When the roller moves away from the tip, member 126 will be returned to the position shown in FIG. 9 by spring 136.

Referring now to FIG. 11, another modification of the invention is shown wherein the advertisement may be applied to eggs at a further location on the machine. The balancing unit is shown as passing around sprocket 66. As the grading conveying means travels past dispensing means 56b and 56c, it is conveying the eggs along a relatively straight path. As the conveying means travels around sprocket 66, it is conveying the eggs along an arcuate path whereby centrifugal force acts on the balancing units, urging each of the balancing units into the uniform position shown in FIG. 11 regardless of the weight of the eggs supported in the balancing units. Accordingly, a dispensing means 56d identical to dispensing means 56 previously described is positioned as shown in FIG. 11 so as to apply advertisements to the outer surfaces of the eggs as they move around sprocket 66.

Figure 12:
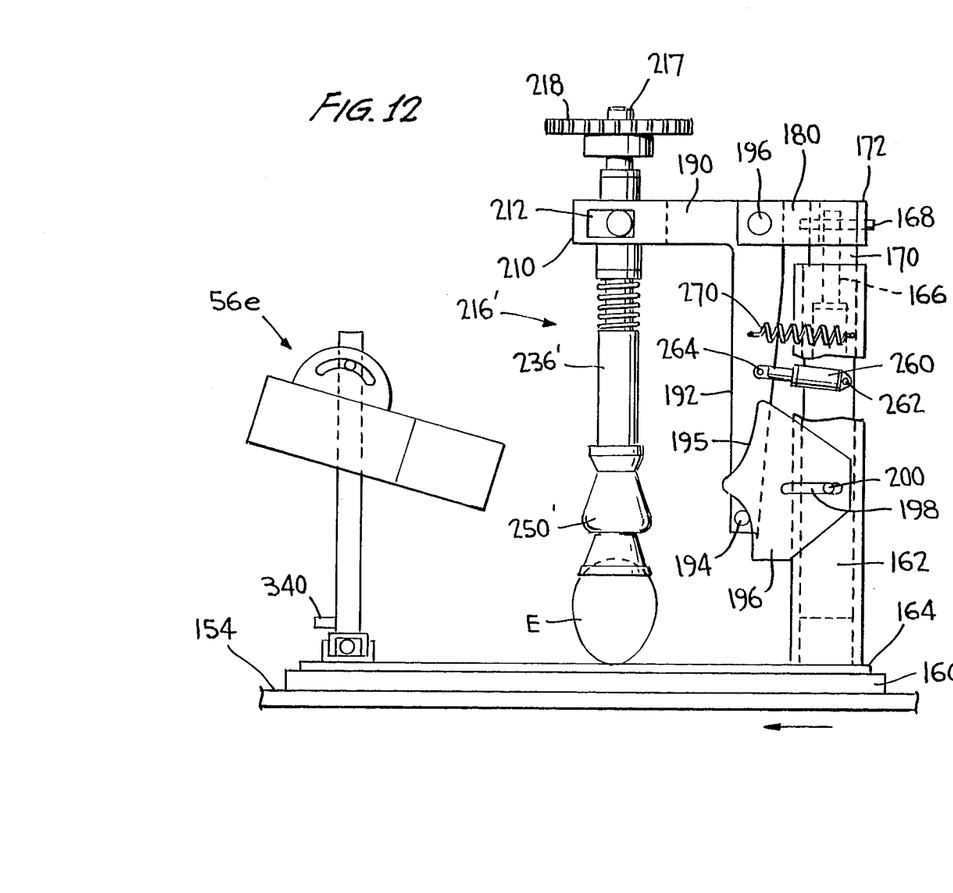
FIG. 12 is a view on an enlarged scale taken along line 12—12 of FIG. 2 looking in the direction of the arrows showing a side view of a modification of the invention.
Figure 13:
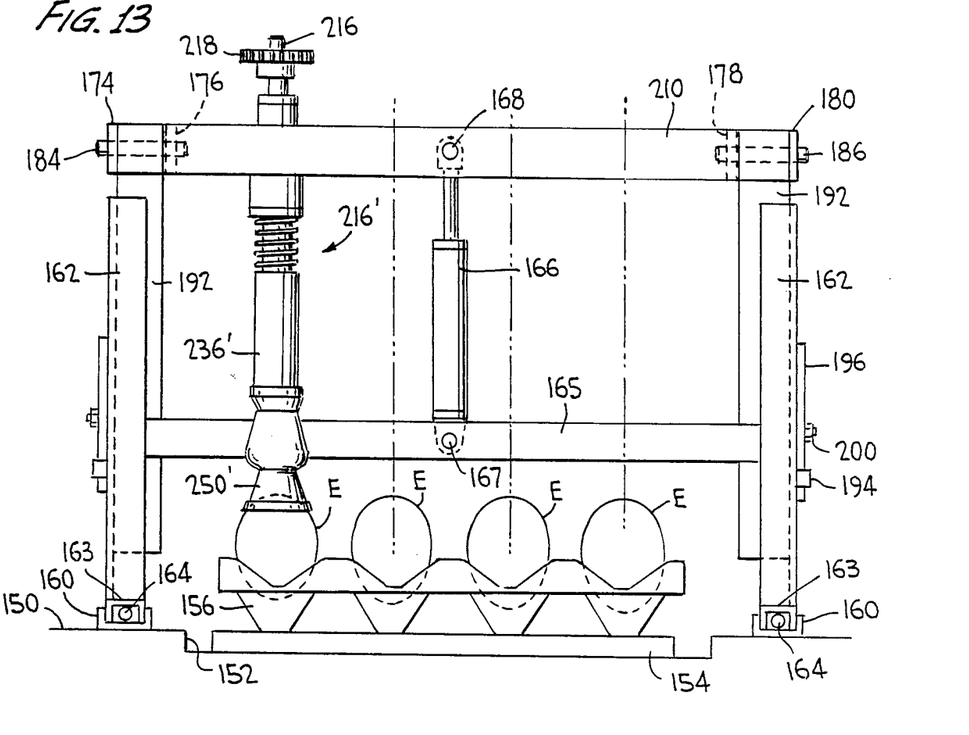
FIG. 13 is a front view of the structure shown in FIG. 12.
Figure 14:
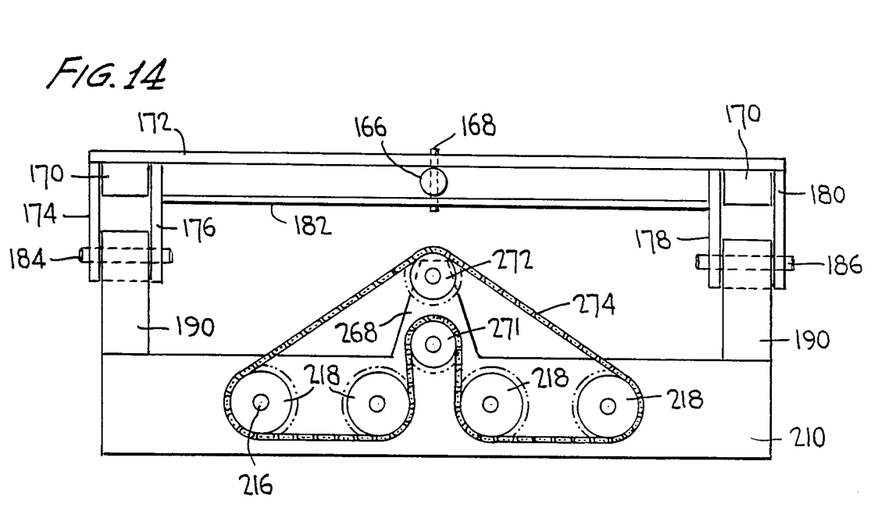
FIG. 14 is a top view of the structure shown in FIG. 12.

Referring to FIGS. 12-14, a further modification of the invention is provided. The construction of these figures may be utilized in conjunction with the packing lanes as shown in FIG. 2, or it may be employed with conveying means at any location remote from a grading machine. As seen in FIG. 13, a support surface 150 is provided with a recessed portion 152 within which a conveyor 154 is movable. The conveyor may be of any type such as a belt, chain or the like adapted to convey a conventional egg carton 156. It should be understood that when utilized with a machine as shown in FIG. 2, the eggs have been graded and deposited in the egg cartons according to grade. As shown in FIG. 13, the carton is adapted to hold four eggs in a row, although any number of eggs may be positioned along side one another. A pair of guide rails 160 of generally U-shaped configuration are disposed on surface 150 at opposite sides of the conveyor and extend longitudinally thereof.

Support means includes a pair of vertical channel members 162 at opposite sides of the conveyor. The lower ends of members 162 are connected to further channel members 163 which are slidable in members 160. Screws 164 are provided for moving members 162 longitudinally with respect to members 160. A crossbar 165 has the opposite ends thereof fixed to members 162. A power operated mechanism 166 has one operative end thereof connected at 167 to crossbar 165, the opposite operative end thereof being connected at 168 to members 172 and 182 hereinafter described.

A pair of vertical members 170 are slidably disposed in members 162, the upper ends of members 170 being interconnected by a rigid crossbar 172 having the opposite ends thereof fixed to members 170. A first pair of spaced lugs 174 and 176 are secured to one end of member 172 and extend forwardly thereof. A second pair of spaced lugs 178 and 180 are secured to the opposite end of member 172. A rigid bar 182 has the opposite ends thereof connected to lugs 176 and 178.

A pin 184 is supported by lugs 174 and 176, and a similar pin 186 is supported by lugs 178 and 180. A pair of similar members 190 are mounted for pivotal movement about the pins, members 190 being generally L-shaped in configuration and including depending arms 192. Cam followers 194 are mounted on the lower ends of arms 192 and cooperate with cam surfaces 195 formed on cams 196. These cams are supported by members 162. Each cam has a slot 198 formed therethrough. A screw 200 extends through each of these slots and is threaded into a suitable hole in the associated member 162. The slots permit the cams to be adjusted with respect to members 162 so as to selectively vary the the motion imparted to arms 192.

A manifold 210 of generally square cross-section is rigidly connected between the outer ends of members 190 and carries a valve 212 which controls the application of vacuum to the manifold from a conventional source of vacuum. The operation of valve 212 may be controlled in a conventional manner.

Figure 15:
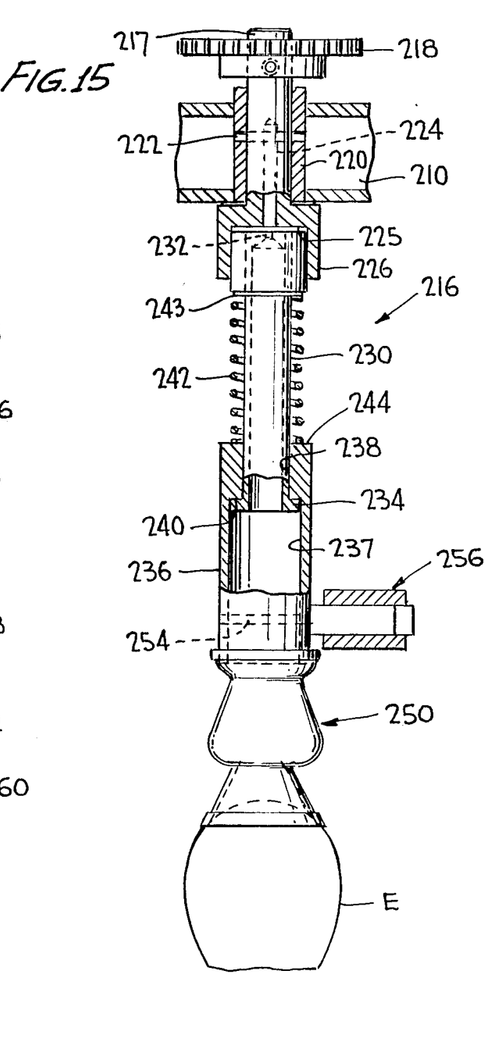
FIG. 15 is a longitudinal sectional view through a modified form of egg handling means according to the invention.

Referring now to FIG. 15, egg handling means indicated generally by reference numeral 216 is illustrated which includes a spindle portion 217 having a sprocket 218 secured to the upper end thereof. The spindle passes downwardly through a bushing 220 mounted in manifold 210, the bushing supporting the spindle for rotation. Passages 22 and 224 in the bushing and spindle provide communication with the cavity 225 defined within the enlarged lower end 226 of the spindle. A first tubular body portion 230 has a relatively small orifice 232 at the upper end thereof which provides communication between cavity 225 and the interior of the body portion. A radially extending circumferential flange 234 is provided about the lower end of body portion 230.

A second tubular body portion 236 includes a stepped cavity therein including a first portion 237 of greater diameter than the second portion 238 and joined by a radial shoulder 240. The shoulder rests against flange 234 to limit downward movement of body portion 236 with respect to body portion 230. Flange 234 has a slidable fit with the surface of cavity portion 237 and accordingly forms a piston reciprocable within member 236 which defines a cylinder. The interior of body portion 230 is in communication with the interior of portion 236. A coil spring 242 is disposed in surrounding relationship to body portion 230, the upper end of the spring resting against a shoulder 243 on body portion 230, and the lower end of the spring resting against the upper edge 244 of body portion 236. The lower body portion 236 is thereby resiliently urged downwardly.

A hollow egg engaging means 250 is of conventional construction and comprises a hollow member formed of rubber or similar resilient material so that the lower end thereof is adapted to conform somewhat to the outer surface of an egg. The upper end of egg engaging means 250 is resiliently secured to the lower end of body portion 236.

A valve 254 is provided within body portion 236 and is radially movable so as to provide communication between cavity portion 237 and the interior of egg engaging means 250 when in open position and to prevent such communication when in the closed position. Power operated means 256 is provided for opening and closing the valve, and is controlled by conventional means.

When the valve is closed and vacuum is applied to the interior of the egg handling means, body portion 236 will move upwardly against the force of the spring. This provides clearance so that eggs may be moved by the conveying means into operative position beneath the egg handling means. Vacuum is then released and the spring will move the egg engaging means into contact with an egg E. The valve is then opened and vacuum is again applied through the body portions. This will result in the egg being drawn into the lower end of means 250 and seal therewith. The vacuum then will again move body portion 236 upwardly. The egg may then have an advertisement applied thereto, or it may be further moved into a desired position if so desired. The egg handling means of FIG. 15 is therefore of such a construction as to effect vertical movement of the egg to position it in a uniform location for application of an advertisement thereto.

After the advertisement is applied to the egg, the vacuum is gradually released thereby lowering the egg gradually back into its initial position within a carton.

Referring again to FIG. 12, the egg handling means 216' shown is identical to that illustrated in FIG. 15 with the exception that the valve and its operating means is eliminated. A dispensing means 56e identical to means 56 previously described is provided. In this case the dispensing means is mounted for movement so that it traverses in a direction at right angles to the direction of movement of the egg conveyor. The advertising material is transferred to each egg at the proper position under the control of suitable sensing means so as to apply the material to precise areas of the eggs. It is noted that four egg handling means are mounted in side by side relation, only one being shown in FIG. 13 for the purpose of illustration.

As seen in FIGS. 12 and 13, egg E is held by egg engaging means 250'. In order to move the egg into proper relationship to the dispensing means, power operated means 166 is operated to move members 172 and 182 and those portions connected thereto upwardly. As these parts move upwardly, cam follower 194 moves along the cam face 195 thereby causing the egg handling means to move into the tilted position shown in FIG. 16. It is apparent that the shape of the cam face may be varied according to the desired movement of the egg.

Figures 16, 17:
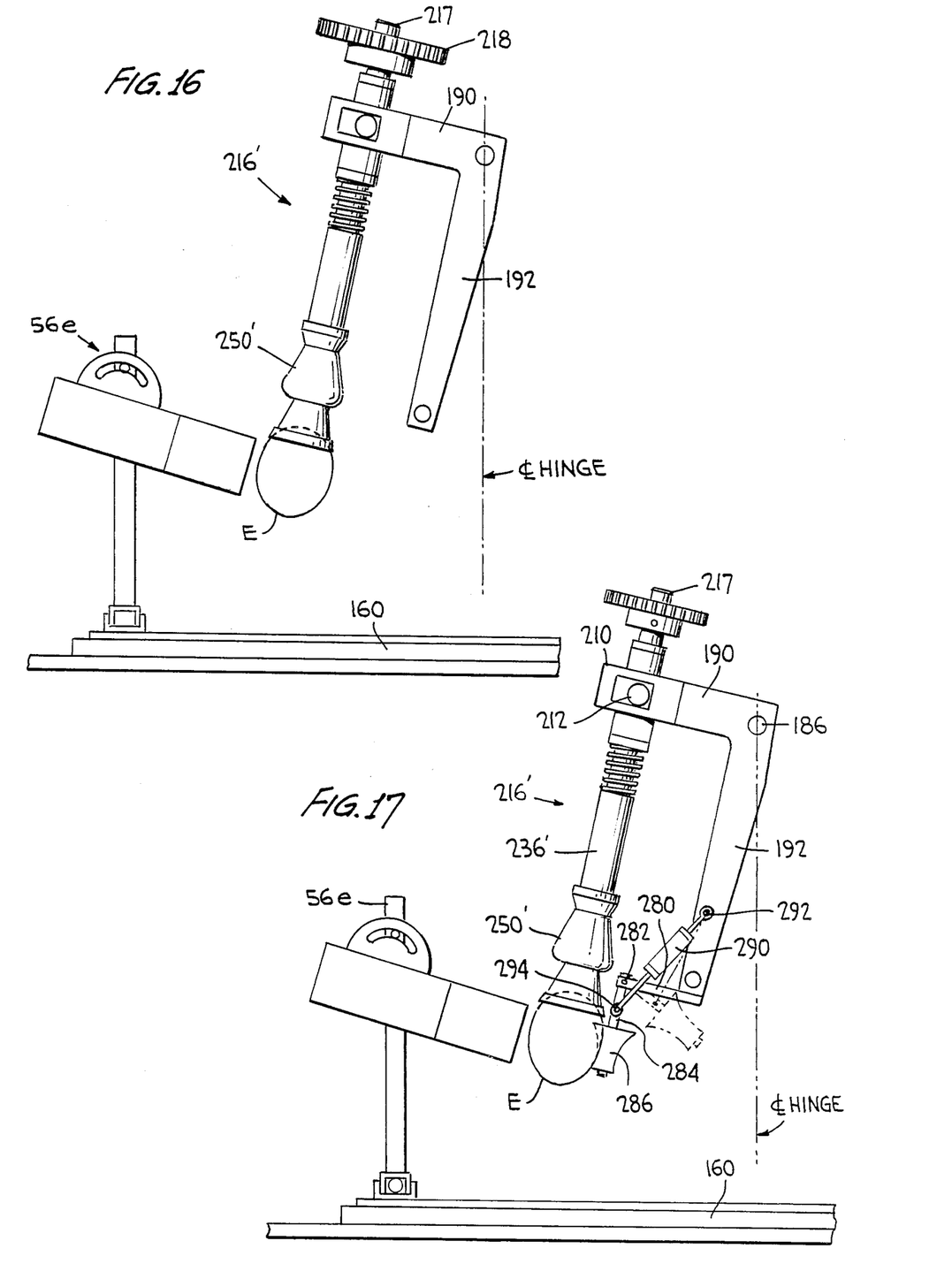
FIG. 16 is a view similar to FIG. 12 showing the parts in a different operative position.
FIG. 17 is a view similar to FIG. 16 showing a modified form of the invention.

As seen in FIG. 12, an alternative means for tilting the egg handling means includes a power operated means 260 having a first operative end 262 pivotally connected to member 170, the opposite operative end 264 being pivotally connected to arm 192. A tension spring 270 has the opposite ends thereof connected to members 170 and 192. This spring holds the cam follower against the cam face and also serves as a safety feature when the members 170 move downwardly. If an obstruction should be in the way of the egg handling means, the egg handling means may tilt into a position as shown in FIG. 16 thereby preventing damage to the egg handling means.

As seen in FIG. 14, four sprockets 218 are illustrated, these sprockets being connected to the spindles of the four egg handling means mounted on the vacuum manifold 210. A bracket 268 extends rearwardly of the manifold and rotatably supports a drive sprocket 271 and an idler sprocket 272. An endless chain 274 engages all of these sprockets as shown whereby all of sprockets 218 will rotate in the same direction and in unison with one another.

This arrangement enables the eggs to be rotated about the long axes of the eggs and the longitudinal axes of the egg handling means. This is particularly significant when applying advertisement material to areas which extend a substantial distance peripherally about the egg. In order to obtain high quality, it is necessary to apply the advertisement material in a direction substantially toward the longitudinal axis of the egg and perpendicular to the surface of the egg. For example, in a line of print extending around an egg, it is necessary to apply each character in the line in such a direction.

By rotating the egg as the advertisement material is applied, the advertisement material is applied in the desired direction so as to obtain the highest degree of quality of the completed advertisement. Rotation of the eggs also enables advertisements to be applied to spaced peripheral portions of the eggs, and any desired peripheral gaps may be provided between portions of the advertisements.

It is further noted that multiple lines of advertisement may be applied to the eggs by moving the egg handling means along its longitudinal axis by operation of power operated means 166. The cam shape can be varied to tilt the egg handling means at the same time. This enables the application of advertisement material on different locations on the surface of the egg.

Figure 18:
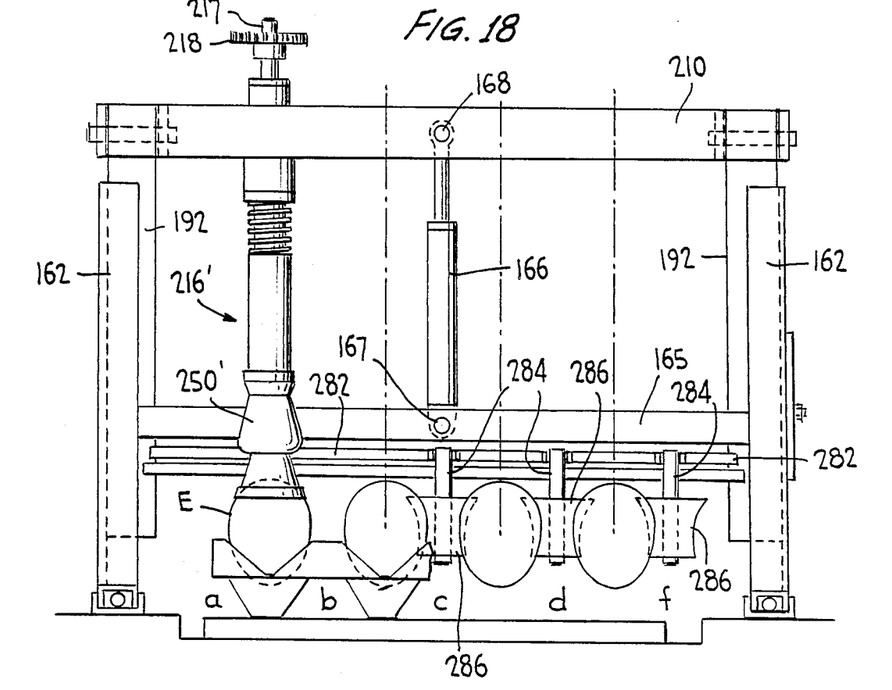
FIG. 18 is an end view of the modified form shown in FIG. 17.

Referring now to FIGS. 17 and 18, a modified form of the invention is shown including means for supporting eggs held by the egg handling means in proper position during part of the operating cycle of the apparatus. Each of arms 192 have a forwardly extending portion 280, the outer ends of which have a rod 282 extending therebetween. A plurality of cylindrical members 284 have the upper ends thereof pivotally connected to rod 282. Support members 286 are rotatably journaled on the lower ends of members 284, the support members having contoured outer surfaces which are concave and approximate the outer shape of eggs. When in the operative position shown in FIG. 18 and 19 and especially when the eggs are supported by egg handling means in a tilted position, the weight of the eggs is supported by these support members to retain the eggs in position such that the long axes of the eggs is aligned with the longitudinal axes of the egg handling means, thereby preventing wobbling of the eggs about the axes of rotation of the associated egg handling means. This ensures high quality of the applied advertisement.

When the eggs are raised or lowered relative to the carton, it is necessary to move the support members relative to the egg handling means so as to prevent damage to the eggs or carton. A power operated means 290 has a first operative end 292 thereof pivotally connected to arm 192 and the opposite operative end thereof pivotally connected to a rod 294. Rod 294 is in turn rotatably supported within each of cylindrical members 284 so that when the power operated means is operated to swing rod 294 upwardly, all of the support members are simultaneously moved into the dotted line position shown in FIG. 17.

Figure 19:
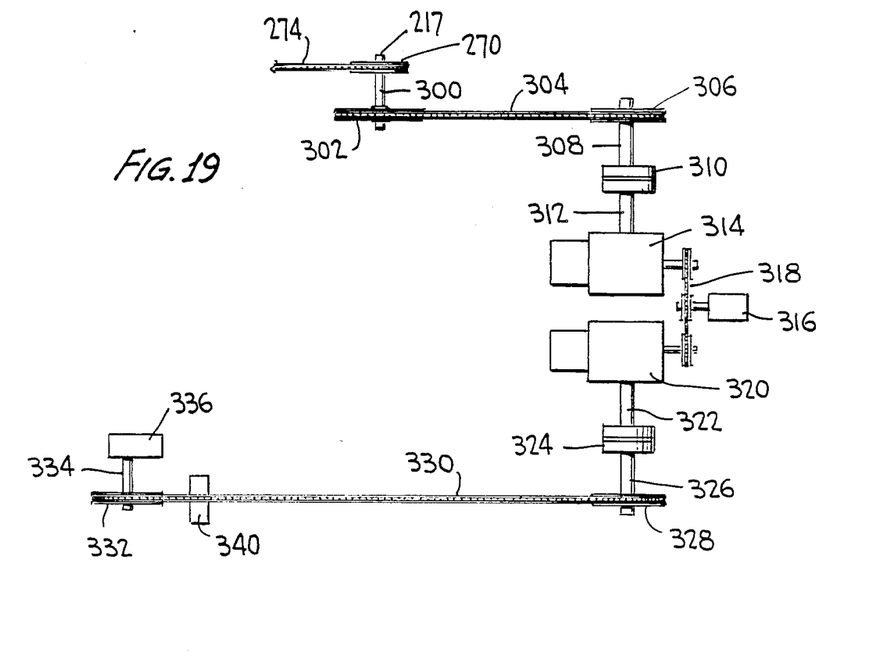
FIG. 19 is a schematic view of the power drive train for the structure shown in FIG. 12-14.

Referring now to FIG. 19, the drive mechanism for the structure shown in FIGS. 12-14 is schematically illustrated. Sprocket 270 is connected to a shaft 300 which is in turn connected to sprocket 302. A drive chain 304 drivingly connects sprocket 302 with a sprocket 306 which is in turn splined on a shaft 308. Shaft 308 is connected through a clutch and brake mechanism 310 and shaft 312 to a reversible variable ratio transmission 314. Transmission 314 is driven by a motor 316 through a drive connection 318 which also serves to drive a similar transmission 320. Transmission 320 is connected through shaft 322, clutch and brake mechanism 324 and shaft 326 to a sprocket 328. A chain 330 connects sprocket 328 with sprocket 332 which is connected on a shaft journaled on the frame 336 of the machine. A connecting member 340 connects chain 330 with the support of the dispensing means 56e for moving the dispensing means along its supporting track transverse to the direction of movement of the conveyor. This drive system is for the purpose of illustration only, and may be modified in any desired manner.

This drive mechanism is operated by suitable control means for carrying out various sequences of operation as required. For example, if clutch 310 is disengaged, and clutch 324 is engaged, the eggs will not rotate, and the dispensing means will be shifted laterally of the conveyor so as to apply advertising material to the adjacent surfaces of the eggs. If clutch 324 is then disengaged and clutch 310 is engaged, the eggs may be turned to a new position. An advertisement may then be applied to the egg by disengaging clutch 310 and engaging clutch 324 to cause the dispensing means to again be shifted to apply advertising material to the eggs at a different portion thereof. Furthermore, both clutches 310 and 324 may be simultaneously engaged so as to shift the dispensing means and rotate the eggs in a desired direction to obtain advertisements of very high quality.

Figure 20:
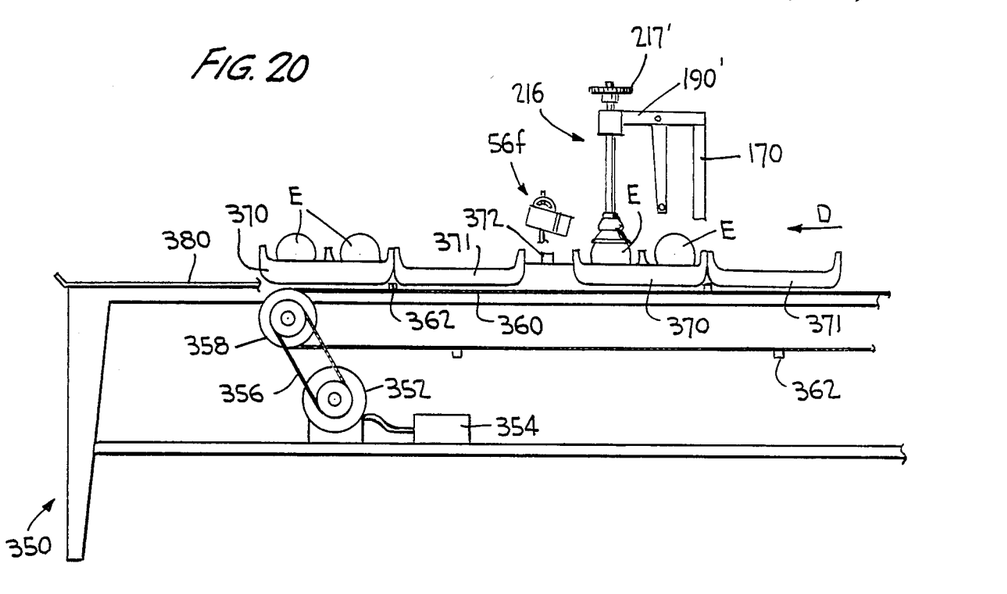
FIG. 20 is a side view of still another form of the invention.
Figure 21:
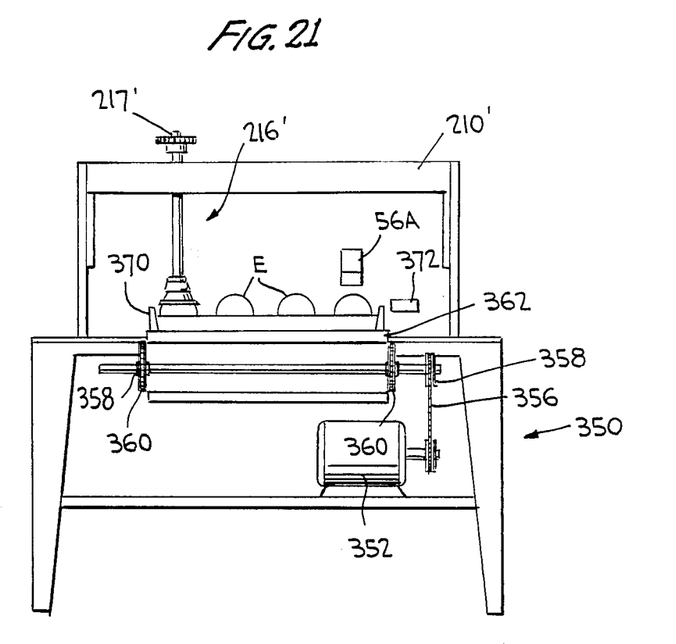
FIG. 21 is an end view of the structure shown in FIG. 20.

Referring now to FIGS. 20 and 21, still another modification of the invention is illustrated wherein the structure is completely separate from a grading machine can be employed in any desired location. A support table 350 has a drive motor 352 mounted thereon, the motor being controlled by a control mechanism 354. A drive chain 356 connects motor 352 with a sprocket 358 which in turn serves to drive a conveyor chain 360 having spaced flights 362 connected thereto. The flights serve to carry along egg cartons in the direction of arrow D. The cartons include covers 371 which are folded down as shown, and eggs E are supported in the cartons.

A sensor 372 is mounted on the table adjacent to the conveyor and senses the presence of eggs under the egg handling means which is identical to the egg handling means shown in FIGS. 12-14. The sensor controls the operation of the drive motor 352 so that the conveyor advances cartons until eggs are in operative position below the egg handling means whereupon the motor is stopped. A dispensing means 56f identical to 56e shown in FIG. 12 is provided for applying advertisement material to the eggs. When the advertisement has been applied, the motor will again be started to move the cartons downstream until further eggs are in operative position. A collecting surface 380 receives the egg cartons to be removed. The invention has been described with reference to preferred embodiments. Obviously, modifications, alterations and other embodiments will occur to others upon reading and understanding this specification. It is my intention to include all such modifications, alterations and alternate embodiments insofar as they come within the scope of the appended claims or the equivalent thereof.

I claim:

1. Apparatus for applying advertisements to the surfaces of eggs comprising, a candling and grading machine, said machine including a candling area and a grading conveying means, an infeed conveying means for feeding eggs to said candling area, a transfer conveying means for transferring eggs from said candling area to said grading conveying means, said grading conveying means having balancing units carried thereby, each of said units having guide means mounted thereon, a guide member supported by said machine in fixed relationship thereto, said guide member extending downstream from the point where said transfer conveying means transfers eggs to said grading conveying means, advertisement dispensing means for providing an advertisement upon the outer surface of eggs conveyed by said grading conveying means, said dispensing means including advertisement material and being supported adjacent to said grading conveying means downstream of said point with a space between the dispensing means and the adjacent eggs at all times during operation of the apparatus, means for transferring said advertisement material from said dispensing means across said space and into contact with the outer surfaces of said eggs, said guide means engaging said guide member to support said eggs in uniform relation adjacent to said dispensing means to enable the advertisement to be provided on a precise area of the eggs.

2. The method of applying advertisements to the surfaces of eggs comprising, conveying eggs to a candling area, candling said eggs at said area, conveying the candled eggs to a transfer point, conveying the eggs by a conveying means downstream from said transfer point along a first path, providing advertisement material at a position adjacent said path and in spaced relationship to said path, transferring advertisement material from said position to the outer surfaces of said eggs along a second path at an angle to said first path, and supporting said eggs downstream from said transfer point by interengaging guide means supported by said conveying means and fixed guide means to a uniform location on said first path adjacent said position to enable the advertisement to be provided on a precise area of the eggs.

3. The method of applying advertisements to the surfaces of eggs comprising, conveying eggs along a relatively straight path, supporting the eggs for movement relative to said path, conveying eggs along an arcuate path such that the eggs move into a uniform position relative to said arcuate path under the influence of centrifugal force, providing advertisement material at a position adjacent said arcuate path and in spaced relationship to said path, and transferring advertisement material from said position to the outer surfaces of said eggs along a further path at an angle to said arcuate path while said eggs are in said uniform position to enable the advertisement to be provided on a precise area of the eggs.

4. Apparatus for applying advertisements to the surfaces of eggs comprising, conveyor means, a plurality of balancing means carried by said conveyor means, each of said balancing means including egg support means mounted for swinging movement relative to said conveyor means, first guide means connected to said egg support means, second guide means supported by the apparatus adjacent said conveyor means and engageable with said first guide means, advertisement dispensing means for providing an advertisement upon the outer surface of eggs conveyed by said conveying means, said dispensing means including advertisement material and being supported by the apparatus adjacent to said conveying means with a space between the dispensing means and the adjacent eggs at all times during operation of the apparatus, means for transferring advertisement material from said dispensing means across said space and into contact with the outer surfaces of said eggs, said first and second guide means engaging one another for guiding the balancing means such that the associated eggs will move into a uniform position adjacent said dispensing means to enable the advertisement to be provided on a precise area of the eggs.

5. Apparatus as defined in claim 4 wherein said second guide means includes a first portion which is fixed relative to said conveyor means and a second portion which is movable relative to said conveyor means.

6. Apparatus as defined in claim 5 wherein said second portion is adjustable in a vertical direction.

7. Apparatus as defined in claim 6 wherein said second portion includes a pair of independently adjustable guide members.

8. Apparatus as defined in claim 4 wherein said second guide means includes a tip portion having a movable part which is tiltable with respect to the second guide means so as to prevent damage to the apparatus.

9. Apparatus as defined in claim 8 wherein said movable part is movable between an innermost position and an outermost position relative to said second guide means, means resiliently urging said movable part into an outermost position, and means for causing tilting movement of said outer portion upon such inward movement.

10. Apparatus as defined in claim 8 wherein said means for causing tilting movement comprises a pin and slot connection between said movable part and said second guide means.

11. Apparatus as defined in claim 8 wherein said means for causing tilting movement comprises a power operated means for moving the movable part, and sensing means mounted near the outer end of said movable part for controlling the operation of said power operated means.

12. Apparatus for applying advertisements to the surfaces of eggs comprising, conveying means for conveying eggs, advertisement dispensing means for providing an advertisement upon the outer surface of eggs conveyed by said conveying means, said dispensing means including advertisement material and being disposed adjacent to said conveying means so that there is a space between the dispensing means and the adjacent eggs at all times during operation of the apparatus, means for transferring said advertisement material from said dispensing means across said space and into contact with the outer surfaces of said eggs, support means disposed adjacent said conveying means, egg handling means movably supported by said support means, said egg handling means including holding means for holding an egg in fixed relation to the egg handling means, and control means for controlling the movement of said egg handling means to move an egg held by said egg handling means into a desired position relative to said dispensing means to enable the advertisement to be provided on a precise area of the eggs.

13. Apparatus as defined in claim 12 including means for causing rotation of an egg held by said egg handling means.

14. Apparatus as defined in claim 13 wherein said egg handling means comprises an elongated means having a longitudinal axis, said means for causing rotation of an egg comprising means for rotating said egg handling means about the longitudinal axis thereof.

15. Apparatus as defined in claim 13 including power drive means for causing rotation of an egg held by said egg handling means.

16. Apparatus as defined in claim 15 wherein said power drive means includes means for reversing the direction of rotation of an egg held by said egg handling means.

17. Apparatus as defined in claim 12 wherein said control means comprises motion guiding means including a cam and a cam follower supported by said support means.

18. Apparatus as defined in claim 12 wherein said control means comprises power operated means for moving the said egg handling means relative to said support means.

19. Apparatus as defined in claim 18 including resilient means biasing said egg handling means in one direction.

20. Apparatus as defined in claim 12 including resilient means biasing said egg handling means in one direction.

21. Apparatus as defined in claim 12 including support means interconnected with said egg handling means for supporting eggs held by said egg handling means in proper position during part of the operating cycle of the apparatus.

22. Apparatus as defined in claim 21 including means for moving said support means with respect to said egg handling means to vary the position of the support means relative to the egg handling means during another part of the operating cycle of the apparatus.

23. Apparatus as defined in claim 12 including a plurality of said egg handling means disposed adjacent one another, said egg handling means being all movable in unison with one another.

24. Apparatus as defined in claim 12 wherein said egg handling means comprises a first tubular body portion having one end thereof in communication with a source of vacuum, a second tubular body portion movably supported by said first body portion, a hollow egg engaging means supported by said second body portion, said second body portion having one end thereof in communication with the interior of said egg engaging means, the opposite end of said first body portion being in communication with the interior of said second body portion, resilient means biasing said second body portion into a first position relative to said first body portion, said second body portion being movable under the influence of vacuum into a second position relative to said first body portion.

25. Apparatus as defined in claim 24 including valve means disposed within the interior of said second body portion for controlling the application of vacuum through said second body portion and said egg engaging means.

26. Apparatus as defined in claim 24 including power operated means connected with said valve means for operating said valve means.

27. Apparatus as defined in claim 12 including power drive means for driving said conveying means, sensor means disposed adjacent said conveying means for sensing the presence of eggs supported on said conveying means, said sensor means being connected with said power drive means for controlling the operation thereof.

28. The method of applying advertisements to the surfaces of eggs comprising, conveying eggs along a first path, providing advertisement material at a position adjacent said path and in spaced relationship to said path, transferring advertising material from said position to the outer surfaces of said eggs along a second path at an angle to said first path, and moving said eggs from said first path into alignment with said second path so as to enable the advertisement to be provided on a precise area of the eggs.

29. The method as defined in claim 28 wherein a plurality of said eggs are moved in unison from said first path into alignment with said second path, and advertisements are provided sequentially on each of said eggs.

30. The method as defined in claim 28 including the further step of subsequently moving said eggs relative to said second path to enable the advertisement to be provided on a different area of the eggs.

31. Apparatus for applying advertisements to the surfaces of eggs comprising, an egg grading machine, said machine having conveying means and including weighing means for supporting eggs at different positions along a first path according to weight, an infeed means for providing eggs to the conveying means, advertisement dispensing means for providing advertisement upon the outer surface of eggs conveyed by said conveying means, said dispensing means including advertisement material and being disposed adjacent to said conveying means with a space between the dispensing means and the adjacent eggs at all times during operation of the apparatus, means for transferring said advertisement material from said dispensing means across said space along a second path and into contact with the outer surfaces of said eggs, means for maintaining said eggs in a uniform position in substantial alignment with said second path when the eggs are adjacent to said dispensing means and the advertisement material is transferred to the outer surfaces of said eggs, and means for adjusting the position of said dispensing means relative to said eggs to enable the advertisement to be provided on a precise area of the eggs.

32. The method of applying advertisements to the surfaces of eggs comprising, feeding eggs to a location, conveying eggs from said location along a first path, supporting said eggs at different positions along said first path according to weight, providing advertisement material at a position adjacent said path and in spaced relationship to said first path, transferring advertisement material from said position to the outer surfaces of said eggs along a second path at an angle to said first path, maintaining said eggs in a uniform position in substantial alignment with said second path when the eggs are adjacent said position and the advertisement material is transferred to the outer surface of said eggs, and adjusting said second path relative to said first path to enable the advertisement to be provided on a precise area of the eggs.

33. The method of applying advertisements to the surfaces of eggs comprising, conveying eggs along a first path, supporting the eggs for movement relative to said path, moving said eggs into different vertical locations relative to one another, selecting certain ones of said eggs in accordance with the vertical locations of the eggs for the application of advertisements thereto, moving the selected eggs into a common vertical position relative to said first path, providing advertising material at a position adjacent said path and in spaced relationship to said path, and transferring advertising material from said position to the outer surfaces of the selected eggs along a further path at an angle to said first path while said eggs are in said common vertical position.

* * * * *